US012683496B2

(12) United States Patent
Wachi

(10) Patent No.: US 12,683,496 B2
(45) Date of Patent: Jul. 14, 2026

(54) POWER SOURCE CONTROL DEVICE, DC/DC CONVERTER, AND VEHICLE

(71) Applicant: ROHM Co., LTD., Kyoto (JP)

(72) Inventor: Takatsugu Wachi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 19/173,388

(22) Filed: Apr. 8, 2025

(65) Prior Publication Data

US 2025/0323576 A1 Oct. 16, 2025

(30) Foreign Application Priority Data

Apr. 16, 2024 (JP) ................................. 2024-066157

(51) Int. Cl.
| | |
|---|---|
| *H02M 3/158* | (2006.01) |
| *B60R 16/033* | (2006.01) |
| *H02M 1/00* | (2007.01) |
| *H02M 3/157* | (2006.01) |

(52) U.S. Cl.
CPC ........... *H02M 3/158* (2013.01); *B60R 16/033* (2013.01); *H02M 1/0032* (2021.05); *H02M 3/157* (2013.01)

(58) Field of Classification Search
CPC .... H02M 3/158; H02M 1/0032; H02M 3/157; B60R 16/033
See application file for complete search history.

(56) References Cited

U.S. PATENT DOCUMENTS

2015/0229210 A1* 8/2015 Takada .................. H02M 3/158
323/284

FOREIGN PATENT DOCUMENTS

JP 2019-221099 12/2019

* cited by examiner

*Primary Examiner* — Carlos Amaya
(74) *Attorney, Agent, or Firm* — CHIP LAW GROUP

(57) ABSTRACT

Provided is a power source control device for a DC/DC converter including a high-side transistor, a low-side transistor, and an inductor, the power source control device including a first error amplifier configured to receive a first reference voltage and a feedback voltage based on an output voltage of the DC/DC converter, a second error amplifier configured to receive an output of the first error amplifier and a signal indicating information regarding a current flowing through the inductor, a first comparator configured to receive an output of the second error amplifier and a ramp voltage, a switching control unit configured to perform switching control of the high-side transistor and the low-side transistor according to an output of the first comparator, and a clamp circuit configured to clamp a second amplifier output voltage outputted from the second error amplifier, to a predetermined clamp voltage.

12 Claims, 14 Drawing Sheets

2

FIG.5
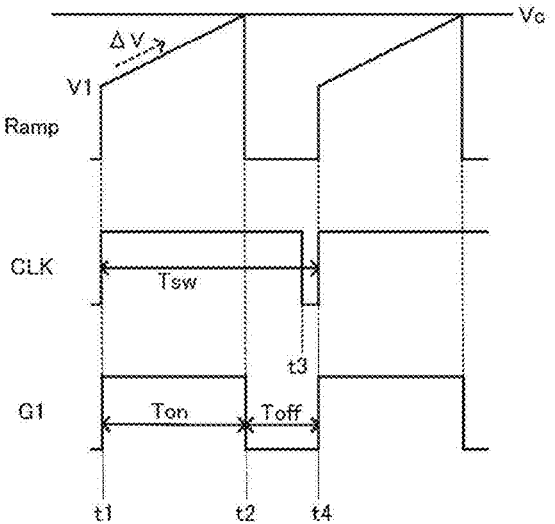
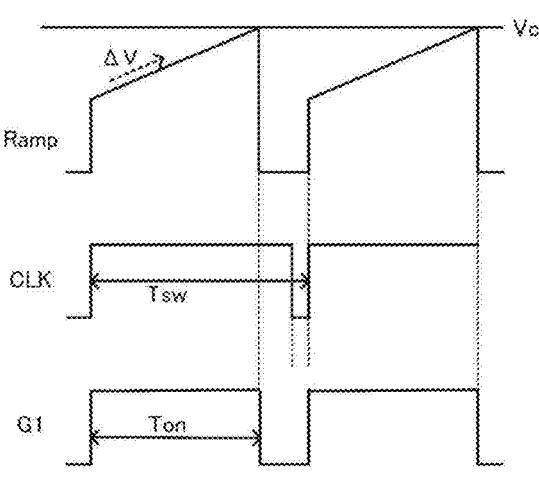

F I G . 1 1
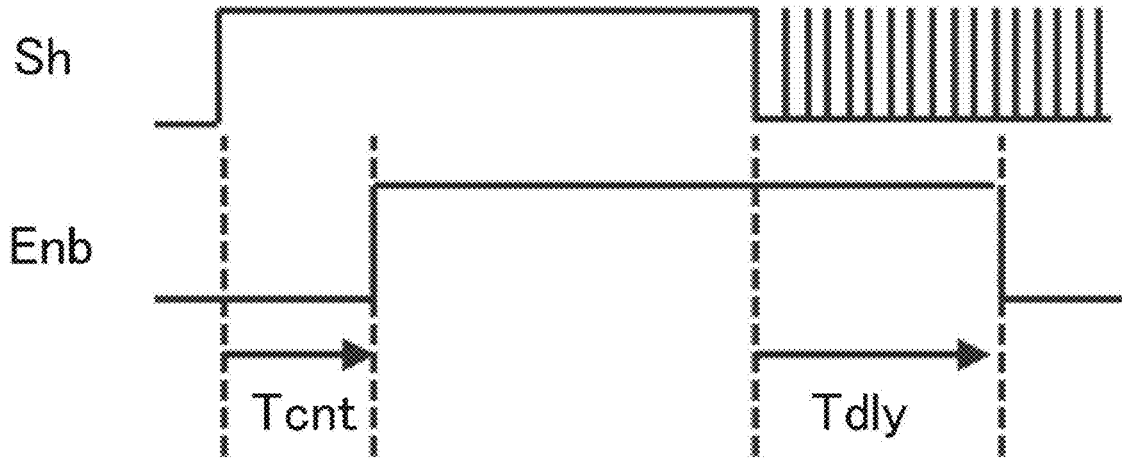
F I G . 1 2
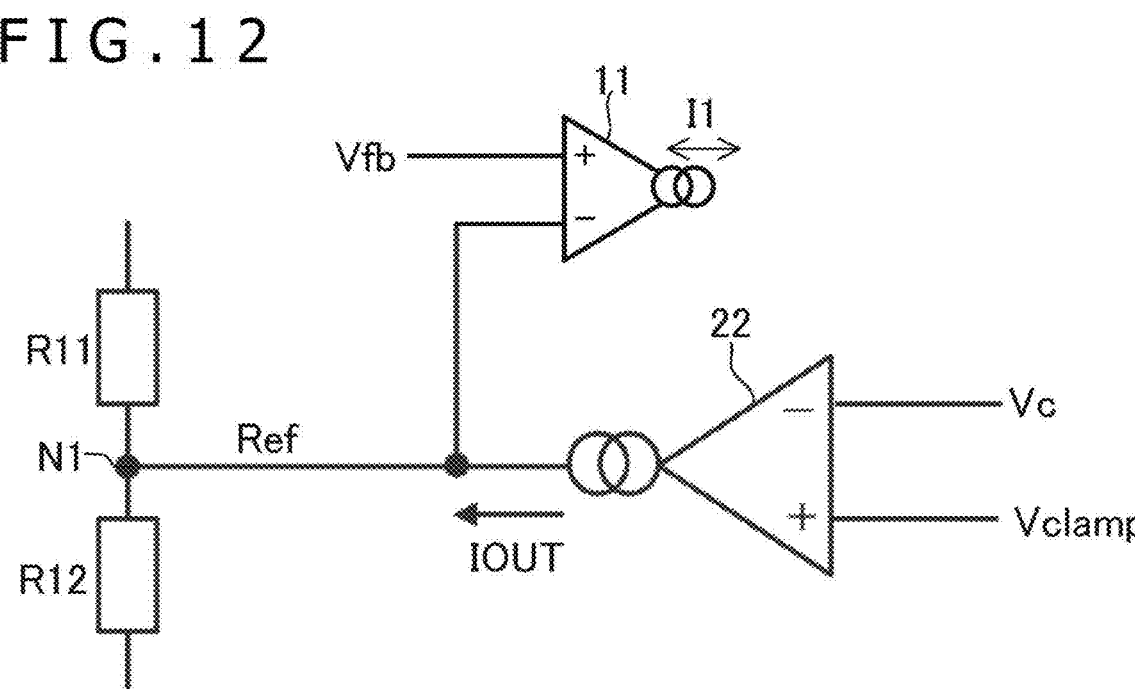

POWER SOURCE CONTROL DEVICE, DC/DC CONVERTER, AND VEHICLE

CROSS REFERENCE TO RELATED APPLICATIONS

This application claims priority benefit of Japanese Patent Application No. JP 2024-066157 filed in the Japan Patent Office on Apr. 16, 2024. Each of the above-referenced applications is hereby incorporated herein by reference in its entirety.

The present disclosure contains subject matter related to that disclosed in Japanese Priority Patent Application filed in the Japan Patent Office on, the entire content of which is hereby incorporated by reference.

BACKGROUND

The present disclosure relates to a power source control device.

A kind of direct current to direct current (DC/DC) converter includes a high-side transistor and a low-side transistor that are connected in series, and a rectifying and smoothing circuit having an inductor and an output capacitor that are connected to a connection node of the transistors. An input voltage is applied between the high-side transistor and the low-side transistor. A rectangular wave voltage which is generated when the high-side transistor and the low-side transistor are alternately turned on/off is rectified and smoothed by the rectifying and smoothing circuit. Accordingly, an output voltage that is lower than the input voltage can be obtained. Here, current mode control considering an inductor current may be performed.

An example of the related art is disclosed in Japanese Patent Laid-open No. 2019-221099.

BRIEF DESCRIPTION OF THE DRAWINGS

FIG. 5 is a diagram depicting waveform examples of a ramp voltage, a clock signal, and a gate signal;

FIG. 11 is a waveform chart indicating an example of the operation of the clamp circuit control unit;

FIG. 12 is a diagram depicting a modification of a configuration for controlling a reference voltage;

DETAILED DESCRIPTION

Hereinafter, an illustrative embodiment of the present disclosure will be explained with reference to the drawings.
<Configuration of DC/DC Converter>

Figure 1:
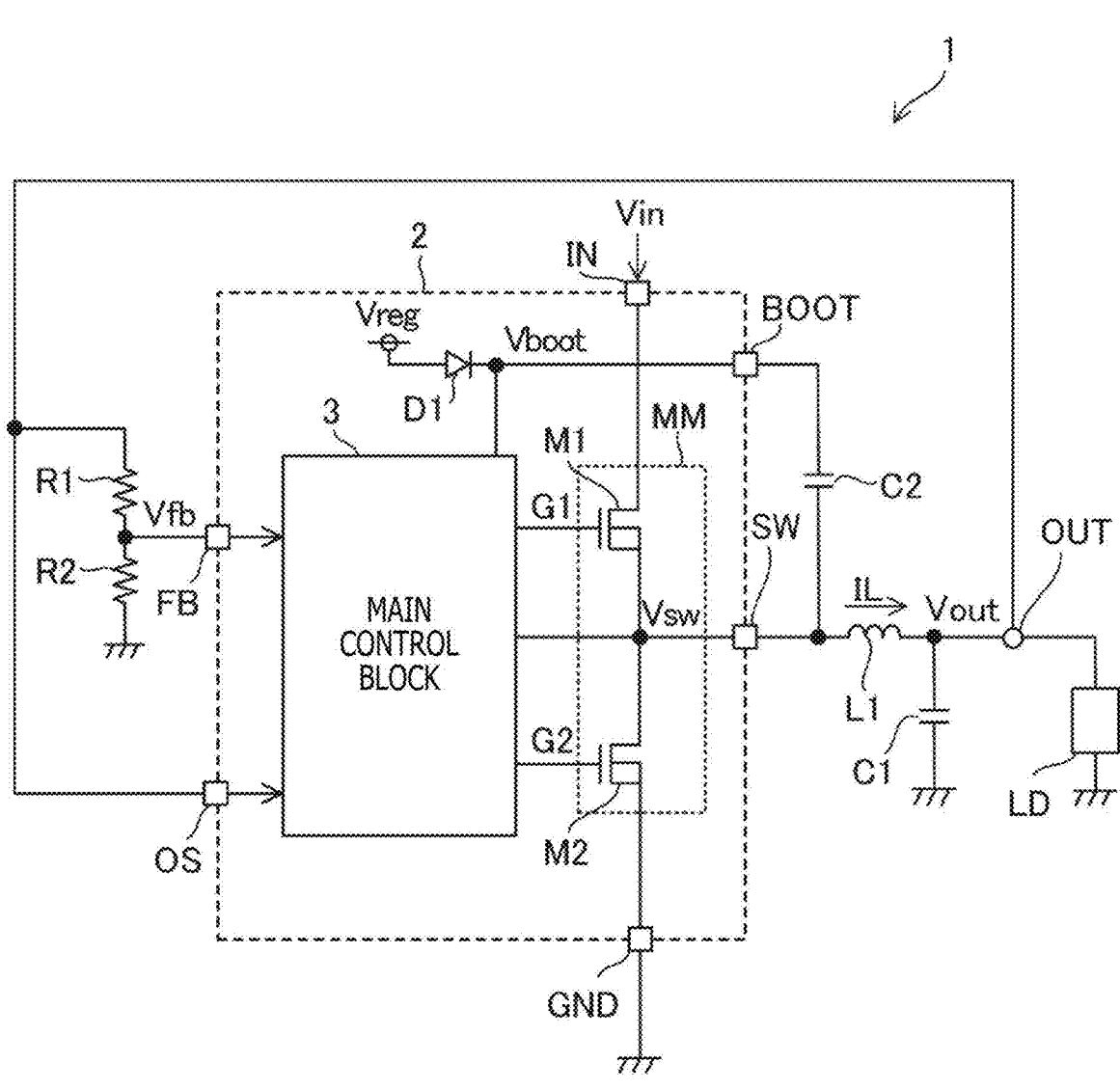
FIG. 1 is an overall configuration diagram of a DC/DC converter according to an embodiment of the present disclosure.

FIG. 1 is an overall configuration diagram of a DC/DC converter 1 according to the embodiment of the present disclosure. The DC/DC converter 1 in FIG. 1 includes a power source IC 2 as a power source control device, and a plurality of discrete components that are externally connected to the power source IC 2. The discrete components include a capacitor C1 serving as an output capacitor, a capacitor C2 serving as a boot capacitor, resistors R1 and R2 serving as feedback resistors, and an inductor L1. The DC/DC converter 1 is formed as a step-down type DC/DC converter to generate a desired output voltage Vout from an input voltage Vin which is supplied from the outside. The output voltage Vout is generated at an output terminal OUT. That is, the output terminal OUT is an application end of the output voltage Vout (a terminal to which the output voltage Vout is applied). The output voltage Vout is supplied to a load LD which is connected to the output terminal OUT.

The input voltage Vin and the output voltage Vout are positive DC voltages. The output voltage Vout is lower than the input voltage Vin. By way of example, when the input voltage Vin is 12 V, the resistance values of resistors R1 and R2 are adjusted to stabilize the output voltage Vout at a desired target voltage which is below 12 V (e.g., 5 V).

Figure 2:
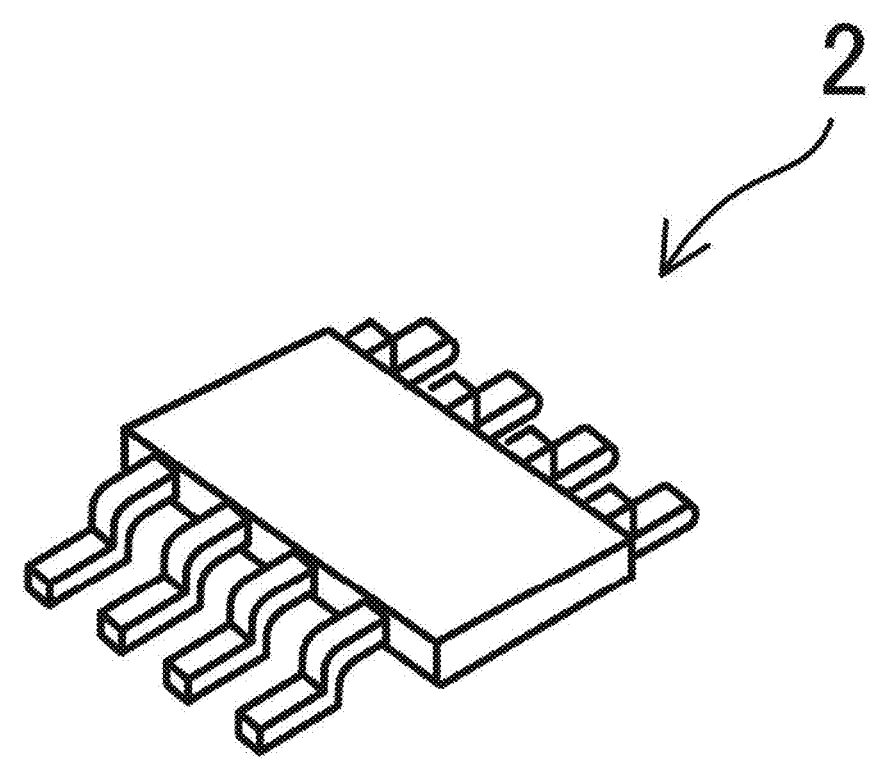
FIG. 2 is a perspective view of an external appearance of a power source integrated circuit (IC)

FIG. 2 depicts a perspective view of an external appearance of the power source IC 2 (power source control device). The power source IC 2 is an electronic component that includes a semiconductor chip having a semiconductor IC formed on a semiconductor substrate, a casing (package) accommodating the semiconductor chip, and a plurality of external terminals exposed from the casing to the outside of the power source IC 2. The power source IC 2 is formed by enclosing the semiconductor chip in the resin-made casing (package). It is to be noted that the number of the external terminals in the power source IC 2 and the type of the casing of the power source IC 2 in FIG. 2 are given merely for illustrative purposes, and they can optionally be designed. An output stage circuit MM, a main control block 3, and a rectifier element D1 which are depicted in FIG. 1 are included in the semiconductor IC. It is to be noted that the output stage circuit MM may be disposed outside the power source IC 2.

In FIG. 1, an input terminal IN, a switch terminal SW, a feedback terminal FB, an output monitoring terminal OS, a boot terminal BOOT, and a ground terminal GND are depicted as some of the external terminals disposed on the power source IC 2 (the same applies to FIG. 3 and later), but any other external terminals (e.g., an enable terminal and a power good terminal) can be further disposed on the power source IC 2.

The external configuration of the power source IC 2 will be explained. From the outside of the power source IC 2, the input voltage Vin is supplied to the input terminal IN. The inductor L1 is disposed in series between the switch terminal SW and the output terminal OUT. Specifically, one end of the inductor L1 is connected to the switch terminal SW, and the other end of the inductor L1 is connected to the output terminal OUT. The output terminal OUT is connected to the ground via the capacitor C1. Specifically, one end of the capacitor C1 is connected to the output terminal OUT, and the other end of the capacitor C1 is connected to the ground. The output terminal OUT is also connected to one end of the resistor R1, and the other end of the resistor R1 is connected to the ground via the resistor R2. A connection node between the resistors R1 and R2 is connected to a feedback terminal FB. The output monitoring terminal OS is connected to the output terminal OUT. Thus, the output voltage Vout is applied to the output monitoring terminal OS. The ground terminal GND is connected to the ground. The capacitor C2 is connected between the boot terminal BOOT and the switch terminal SW. That is, one end of the capacitor C2 is connected to the boot terminal BOOT, and the other end of the capacitor C2 is connected to the switch terminal SW. It is to be noted that a current flowing through the inductor L1 is referred to as an inductor current IL.

The internal configuration of the power source IC 2 will be explained. The power source IC 2 includes the output stage circuit MM, the main control block 3 for controlling the output stage circuit MM, and the rectifier element D1.

The output stage circuit MM includes a high-side transistor M1 and a low-side transistor M2. It is assumed herein that the transistors M1 and M2 are N-channel metal oxide semiconductor field effect transistors (NMOSFETs). The transistors M1 and M2 correspond to a pair of switching elements that are connected in series between the input terminal IN and the ground terminal GND (in other words, the ground). When the transistors M1 and M2 are switchingly driven to switch the input voltage Vin, a switching voltage Vsw which has a rectangular wave shape is generated at the switch terminal SW. Specifically, a drain of the transistor M1 is connected to the input terminal IN, which is an application terminal of the input voltage Vin, and a source of the transistor M1 and a drain of the transistor M2 are both connected to the switch terminal SW. A source of the transistor M2 is connected to the ground terminal GND.

The high-side transistor M1 functions as an output transistor. The low-side transistor M2 functions as a synchronous rectification transistor. The inductor L1 and the capacitor C1 constitute a rectification and smoothing circuit that generates the output voltage Vout by rectifying and smoothing the rectangular wave switching voltage Vsw generated at the switch terminal SW. The resistors R1 and R2 constitute a voltage division circuit that divides the output voltage Vout. A feedback voltage Vfb which is a divided voltage of the output voltage Vout is generated at the connection node between the resistors R1 and R2. Since the connection node between the resistors R1 and R2 is connected to the feedback terminal FB, the feedback voltage Vfb is inputted to the feedback terminal FB.

Gate signals G1 and G2 are respectively supplied to gates of the transistors M1 and M2. The transistors M1 and M2 are turned on and off according to the gate signals G1 and G2. The high-side transistor M1 is in the ON state when the gate signal G1 is high, and the high-side transistor M1 is in the OFF state when the gate signal G1 is low. Likewise, the low-side transistor M2 is in the ON state when the gate signal G2 is high, and the low-side transistor M2 is in the OFF state when the gate signal G2 is low. Basically, switching drive of the transistors M1 and M2 is complementarily performed. However, a simultaneous OFF time period (dead time) in which both the transistors M1 and M2 are in the OFF state may be provided.

The main control block 3 is connected to the respective gates of the transistors M1 and M2, the switch terminal SW, the feedback terminal FB, and the output monitoring terminal OS. The main control block 3 controls the ON/OFF states of the respective transistors M1 and M2 through level control of the gate signals G1 and G2 on the basis of the feedback voltage Vfb. Accordingly, the output voltage Vout corresponding to the feedback voltage Vfb is generated at the output terminal OUT. The output voltage Vout may be given to the main control block 3 as depicted in FIG. 1. The main control block 3 can perform overvoltage protection on the basis of the output voltage Vout, and can also generate pseudo current information by referring to the output voltage Vout (the details will be described later).

The power source IC 2 is provided with an internal power source circuit (note depicted) that generates an internal power source voltage Vreg on the basis of the input voltage Vin. The internal power source voltage Vreg has a predetermined positive DC voltage value. In the example in FIG. 1, the rectifier element D1 is a diode. In this case, an anode of the diode serving as the rectifier element D1 is connected to an application end of the internal power source voltage Vreg, and a cathode thereof is connected to the boot terminal BOOT. The rectifier element D1 may be a switching element that is turned on during an ON period of the transistor M2. A bootstrap circuit includes the rectifier element D1 and the capacitor C2. A voltage applied to the boot terminal BOOT is referred to as a boot voltage Vboot. The main control block 3 can be driven on the basis of the internal power source voltage Vreg or the boot voltage Vboot.

When the output stage circuit MM is in a low output state (where the high-side transistor M1 is in the OFF state while the low-side transistor M2 is in the ON state), the capacitor C2 is charged through the rectifier element D1 on the basis of the internal power source voltage Vreg. Accordingly, the boot voltage Vboot becomes higher than the switching voltage Vsw by a voltage between both ends of the capacitor C2. Subsequently, when the output stage circuit MM enters a high output state (where the high-side transistor M1 is in the ON state while the low-side transistor M2 is in the OFF state), the boot voltage Vboot is maintained to be higher than the switching voltage Vsw by the voltage between both ends of the capacitor C2.

The gate signal G1 is a signal that is based on the potential of the switch terminal SW. Specifically, the gate signal G1 at a low level has a potential equal to that of the switch terminal SW, and the gate signal G1 at a high level is higher than the potential of the switch terminal SW by the difference between the voltage Vboot and the voltage Vsw. The main control block 3 can generate the high-level gate signal G1 on the basis of the boot voltage Vboot. On the other hand, the gate signal G2 is a signal that is based on the ground potential. Specifically, the gate signal G2 at a low level has the ground potential, and the gate signal G2 at a high level has a potential that is higher than the ground potential by a predetermined voltage (e.g., the internal power source voltage Vreg).

Figure 3:
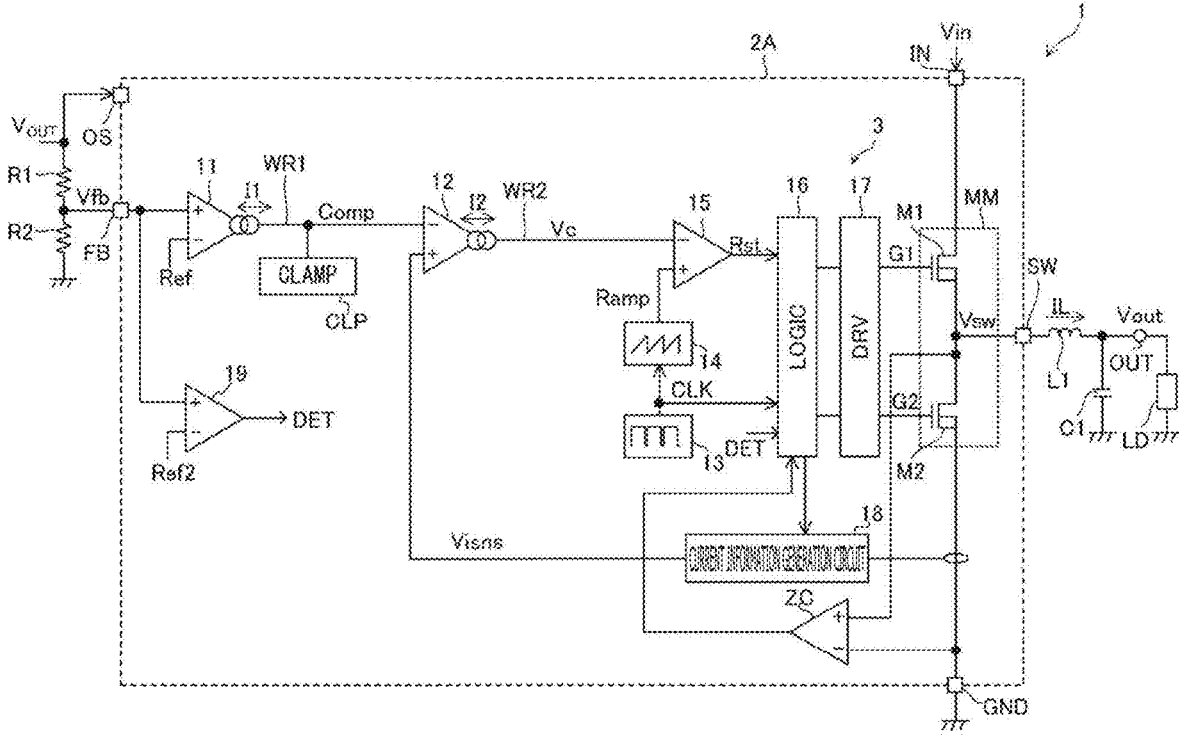
FIG. 3 depicts a configuration of the DC/DC converter including the power source IC.

FIG. 3 depicts the configuration of the DC/DC converter 1 including a power source IC 2A. The power source IC 2A is an example of the power source IC 2. The above explanation of the power source IC 2 also applies to the power source IC 2A as far as no inconsistency occurs.

The main control block 3 in the power source IC 2A includes an error amplifier 11, an error amplifier 12, a clock generation circuit 13, a ramp voltage generation circuit 14, a comparator 15, a logic circuit 16, a driver 17, and a current information generation circuit 18. In the power source IC 2A, a switching operation is performed on the basis of pulse width modulation (PWM). Hereinafter, the functions and operations of the units will be explained. It is to be noted that a clamp circuit CLP and a zero-cross circuit ZC are also disposed on the main control block 3, but these circuits will be explained later.

The error amplifier 11 is a current-output type transconductance amplifier. The error amplifier 11 includes an inverted input terminal (−), a non-inverted input terminal (+), and an output terminal. The output terminal of the error amplifier 11 is connected to a wire WR1. The non-inverted input terminal of the error amplifier 11 is connected to the feedback terminal FB, and receives supply of the feedback voltage Vfb. A predetermined reference voltage Ref is supplied to the inverted input terminal of the error amplifier 11. The reference voltage Ref is a DC voltage having a positive predetermined voltage value, and is generated in a reference voltage generation circuit (not depicted) of the power source IC 2A.

A current signal I1 corresponding to the difference between the feedback voltage Vfb and the reference voltage Ref is outputted from the output terminal of the error amplifier 11, whereby an amplifier output voltage Comp corresponding to the difference between the feedback voltage Vfb and the reference voltage Ref is generated at the wire WR1. An electric charge from the current signal I1 is inputted to/outputted from the wire WR1. Specifically, when the feedback voltage Vfb is higher than the reference voltage Ref, the error amplifier 11 outputs a current of the current signal I1 toward the wire WR1 so as to increase the potential of the wire WR1. When the feedback voltage Vfb is lower than the reference voltage Ref, on the other hand, the error amplifier 11 draws in the current of the current signal I1 from the wire WR1 so as to reduce the potential of the wire WR1. As the absolute value of the difference between the feedback voltage Vfb and the reference voltage Ref increases, the magnitude of the current of the current signal I1 becomes larger.

It is to be noted that a phase compensation circuit, which is not depicted in FIG. 3, is disposed between the wire WR1 and the ground to receive the current signal I1 and compensate the phase of the amplifier output voltage Comp. The phase compensation circuit includes a serial circuit of a resistor and a capacitor. Specifically, one end of the resistor is connected to the wire WR1, and the other end of the resistor is connected to one end of the capacitor. The other end of the capacitor is connected to the ground. The resistance value of the resistor and the capacitance value of the capacitor are properly determined, so that the phase of the amplifier output voltage Comp can be compensated to prevent oscillation of an output feedback loop.

As with the error amplifier 11, the error amplifier 12 is a current-output type transconductance amplifier. The error amplifier 12 includes an inverted input terminal, a non-inverted input terminal, and an output terminal. The output terminal of the error amplifier 12 is connected to a wire WR2. The inverted input terminal of the error amplifier 12 is connected to the wire WR1, and receives supply of the amplifier output voltage Comp. A current detection signal Visns is supplied to the non-inverted input terminal of the error amplifier 12. The current detection signal Visns is a voltage signal indicating a detection result of the inductor current IL, which will be explained in detail later.

By outputting a current signal I2 corresponding to the difference between the amplifier output voltage Comp and the current detection signal Visns from an output terminal of the error amplifier 12, the error amplifier 12 generates, at the wire WR2, the amplifier output voltage Vc corresponding to the difference between the amplifier output voltage Comp and the current detection signal Visns. An electric charge from the current signal I2 is inputted to/outputted from the wire WR2. Specifically, when the amplifier output voltage Comp is lower than the current detection signal Visns, the error amplifier 12 outputs a current of the current signal I2 toward the wire WR2 so as to increase the potential of the wire WR2. When the amplifier output voltage Comp is higher than the current detection signal Visns, on the other hand, the error amplifier 12 draws in the current of the current signal I2 from the wire WR2 so as to reduce the potential of the wire WR2. As the absolute value of the difference between the amplifier output voltage Comp and the current detection signal Visns increases, the magnitude of the current of the current signal I2 becomes larger.

It is to be noted that a phase compensation circuit, which is not depicted in FIG. 3, is disposed between the wire WR2 and the ground to receive the current signal I2 and compensate the phase of the amplifier output voltage Vc. This phase compensation circuit includes a serial circuit of a resistor and a capacitor. Specifically, one end of the resistor is connected to the wire WR2, and the other end of the resistor is connected to one end of the capacitor. The other end of the capacitor is connected to the ground. The resistance value of the resistor and the capacitance value of the capacitor are properly determined, so that the phase of the amplifier output voltage Vc can be compensated to prevent oscillation of an output feedback loop.

The clock generation circuit 13 generates and outputs a clock signal CLK. The clock signal CLK is a rectangular wave signal having a predetermined switching frequency fsw, and the signal level thereof takes a low level and a high level alternately. The clock signal CLK is outputted from the clock generation circuit 13 to the ramp voltage generation circuit 14 and the logic circuit 16.

The ramp voltage generation circuit 14 generates a ramp voltage Ramp. By way of example, the ramp voltage Ramp has a sawtooth-like voltage waveform, which will be explained later. Alternatively, the ramp voltage may have a triangular wave shape, for example. The ramp voltage Ramp depends on the clock signal CLK.

The amplifier output voltage Vc is applied to the inverted input end of the comparator 15. The ramp voltage Ramp is applied to the non-inverted input end of the comparator 15. The comparator 15 compares the amplifier output voltage Vc and the ramp voltage Ramp, and outputs a reset signal Rst. The reset signal Rst is supplied to the logic circuit 16.

By controlling the driver 17 according to the clock signal CLK and the reset signal Rst, the logic circuit 16 controls the gate signals G1 and G2. Under control of the logic circuit 16, the driver 17 supplies the gate signals G1 and G2 on the basis of the signals CLK and Rst to the transistors M1 and M2, whereby the output stage circuit MM is caused to perform a switching operation. In the switching operation, the transistors M1 and M2 are alternately turned on and off according to the signals CLK and Rst. The error amplifier 11 generates the current signal I1 in such a manner that the feedback voltage Vfb and the reference voltage Ref are equal to each other. Through the switching operation, the output voltage Vout is stabilized to a predetermined target voltage according to the reference voltage Ref and the ratio of divided pressures of the resistors R1 and R2.

A comparator 19 is disposed in order to detect a light load state. The feedback voltage Vfb is applied to a non-inverted input end of the comparator 19. A reference voltage Ref2 (>Ref) is applied to an inverted input end of the comparator 19. The comparator 19 compares the feedback voltage Vfb and the reference voltage Ref2, and outputs a detection signal DET as a comparison result. The detection signal DET is supplied to the logic circuit 16. Light load mode control will be explained later.

<Current Mode Control>

Figure 4:
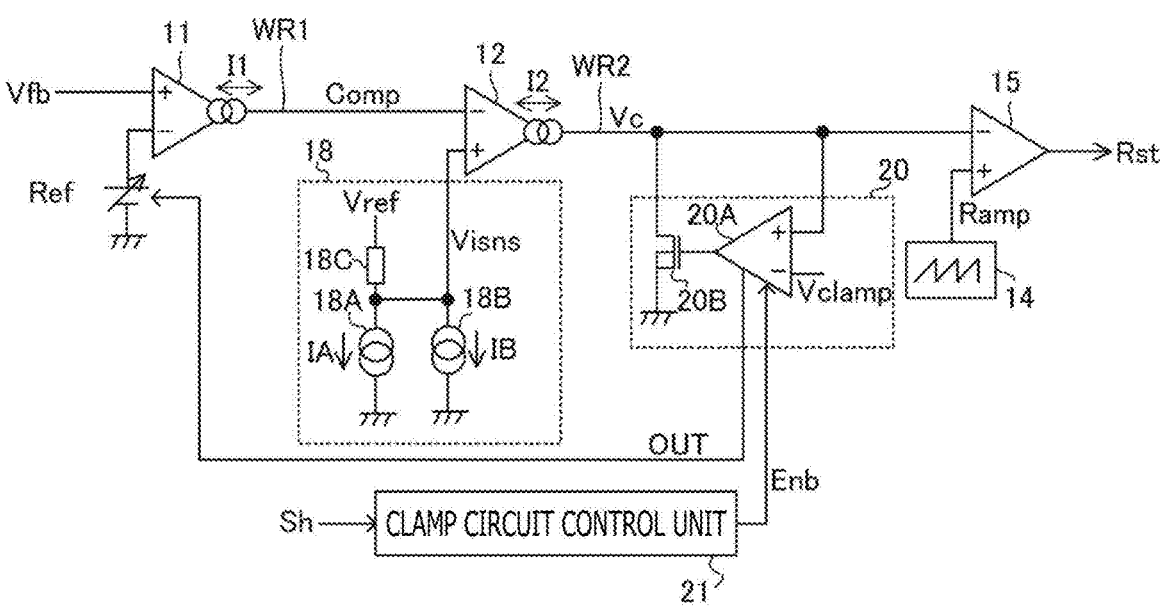
FIG. 4 is a diagram depicting configuration examples of peripheral circuits of an error amplifier and a comparator.

Here, the current information generation circuit 18 will be explained with reference to FIG. 4. With the current information generation circuit 18, current mode control can be performed. FIG. 4 is a diagram depicting configuration examples of peripheral circuits of the error amplifiers 11 and 12 and the comparator 15. The current information generation circuit 18 includes a current detection unit 18A, a pseudo current detection unit 18B, and a resistor 18C, as depicted in FIG. 4.

The current detection unit 18A detects an inductor current IL that flows when the low-side transistor M2 is in the ON state. The pseudo current detection unit 18B does not operate during a normal operation. However, during a frequency division operation (explained later), turning on of the low-side transistor M2 (a transition from the OFF state to the ON state) is omitted in a switching cycle. Accordingly, the current detection unit 18A may not detect the inductor current IL flowing during the ON state of the low-side transistor M2. To this end, the pseudo current detection unit 18B detects a pseudo inductor current IL during the frequency division operation.

In the frequency division operation, turning on of the low-side transistor M2 is omitted in a switching cycle. Therefore, the ON state of the high-side transistor M1 is maintained, and the high output state of the output stage circuit MM is also maintained. As a pseudo current (detection current IB detected by the pseudo current detection unit 18B), an estimated increased amount of the inductor current IL during the high output state is superimposed on a detection current IA detected by the current detection unit 18A. A method for detecting the pseudo current will be explained.

A gradient $\Delta$IL of the inductor current IL during the high output state of the output stage circuit MM is expressed by Expression (1). In Expression (1), L1 represents an inductance (inductance value) of the inductor L1. When the gradient $\Delta$IL of the inductor current IL is obtained, the abovementioned increased amount of the inductor current IL is obtained. Accordingly, the pseudo current to be superimposed is determined.

$$\Delta IL = \left( (Vin - Vout/L1) \times Ton \right) \tag{1}$$

where Ton=Duty×(1/fsw), and Duty=Vout/Vin.

It is assumed that the inductance of the inductor L1 in the DC/DC converter 1 is set to a predetermined value and that the inductance of the inductor L1 in the power source IC 2A is a known value. In addition, the power source IC 2A can recognize the input voltage Vin by detecting a voltage at the input terminal IN. Moreover, the power source IC 2A can recognize the output voltage Vout by detecting a voltage at the output monitoring terminal OS. Therefore, in the power source IC 2A, the gradient $\Delta$IL can be obtained according to Expression (1) on the basis of the input voltage Vin, the output voltage Vout, and the inductance of the inductor L1.

A pseudo current Ipseudo to be superimposed is derived for the gradient $\Delta$IL according to Expression (2).

$$Ipseudo = \Delta IL \cdot k \tag{2}$$

where k represents a coefficient. AIL is inputted to the circuit side theoretically, but is multiplied by the coefficient in order to match IF (e.g., voltage level) with the circuit side.

Each time turning on of the low-side transistor M2 is omitted, the pseudo current Ipseudo is superimposed.

As the detection current IA or a current obtained by superimposing the detection current IB (pseudo current) on the detection current IA flows through the resistor 18C, a voltage having fallen from a reference voltage Vref by an amount of a voltage drop at the resistor 18C is generated as the current detection signal Visns, as depicted in FIG. 4.

<Frequency Division Operation Function>

Next, a frequency division operation function of the power source IC 2A will be explained. The frequency division operation is performed in order to regulate the output voltage Vout even if the input voltage Vin drops (voltage reduction).

In FIG. 5, the left side illustrates a timing chart indicating an operation example when the input voltage Vin is at a normal value. In FIG. 5, waveform examples of the ramp voltage Ramp, the clock signal CLK, and the gate signal G1 are illustrated from the top. It is to be noted that the gate signal G2, which is not depicted in FIG. 5, is an inverted signal of G1.

First, a rise of the clock signal CLK at a timing t1 triggers a rise of the ramp voltage Ramp to a bottom voltage V1, and also triggers switching of the gate signal G1 to a high level. At this timing, the gate signal G2 is switched to a low level. As a result, the high-side transistor M1 is in the ON state, the low-side transistor M2 is in the OFF state, and the output stage circuit MM is in the high output state. The bottom voltage V1 is determined on the basis of a power source voltage Vdd. The power source voltage Vdd is generated by a voltage generation circuit (not depicted) disposed in the power source IC 2A. It is to be noted that the ramp voltage Ramp then increases from the bottom V1 with the gradient $\Delta$V. The gradient $\Delta$V depends on the input voltage Vin.

Subsequently, at a timing t2, the ramp voltage Ramp reaches the amplifier output voltage Vc, the reset signal Rst is asserted, and the gate signal G1 is switched to a low level. At this timing, the gate signal G2 is switched to a high level. As a result, the output stage circuit MM enters the low output state. At this timing, the ramp voltage Ramp falls. Subsequently, the clock signal CLK falls at a timing t3, and rises again at a timing t4. This triggers a rise of the ramp voltage Ramp to the bottom voltage V1, and also triggers switching of the gate signal G1 to a high level. Thereafter, the same is repeated.

A switching cycle Tsw includes an ON time period Ton (timing t1 to timing t2) during which the high-side transistor M1 is in the ON state and an OFF time period Toff (timing t2 to timing t4) during which the high-side transistor M1 is in the OFF state. Thus, PWM control is performed on the basis of a duty Ton/Tsw.

In FIG. 5, the right side is a timing chart indicating waveform examples in a case where the input voltage Vin decreases from a normal value. Due to the decrease of the input voltage Vin, the gradient $\Delta$V of an increase of the ramp voltage Ramp is smaller than that in a normal time (the left side in FIG. 5). Accordingly, the ON time period Ton in the switching cycle Tsw is long, and the duty is large.

It is to be noted that the ramp voltage Ramp is forcibly caused to fall if the ramp voltage Ramp does not reach the amplifier output voltage Vc before the clock signal CLK falls (at a timing t3).

In this manner, when the input voltage Vin decreases, the OFF time period Toff is shortened. Here, a time period for ensuring the ON state of the low-side transistor M2 for bootstrapping is required. Therefore, a minimum OFF time period Toffmin which is the shortest OFF time Toff is set.

Figure 6:
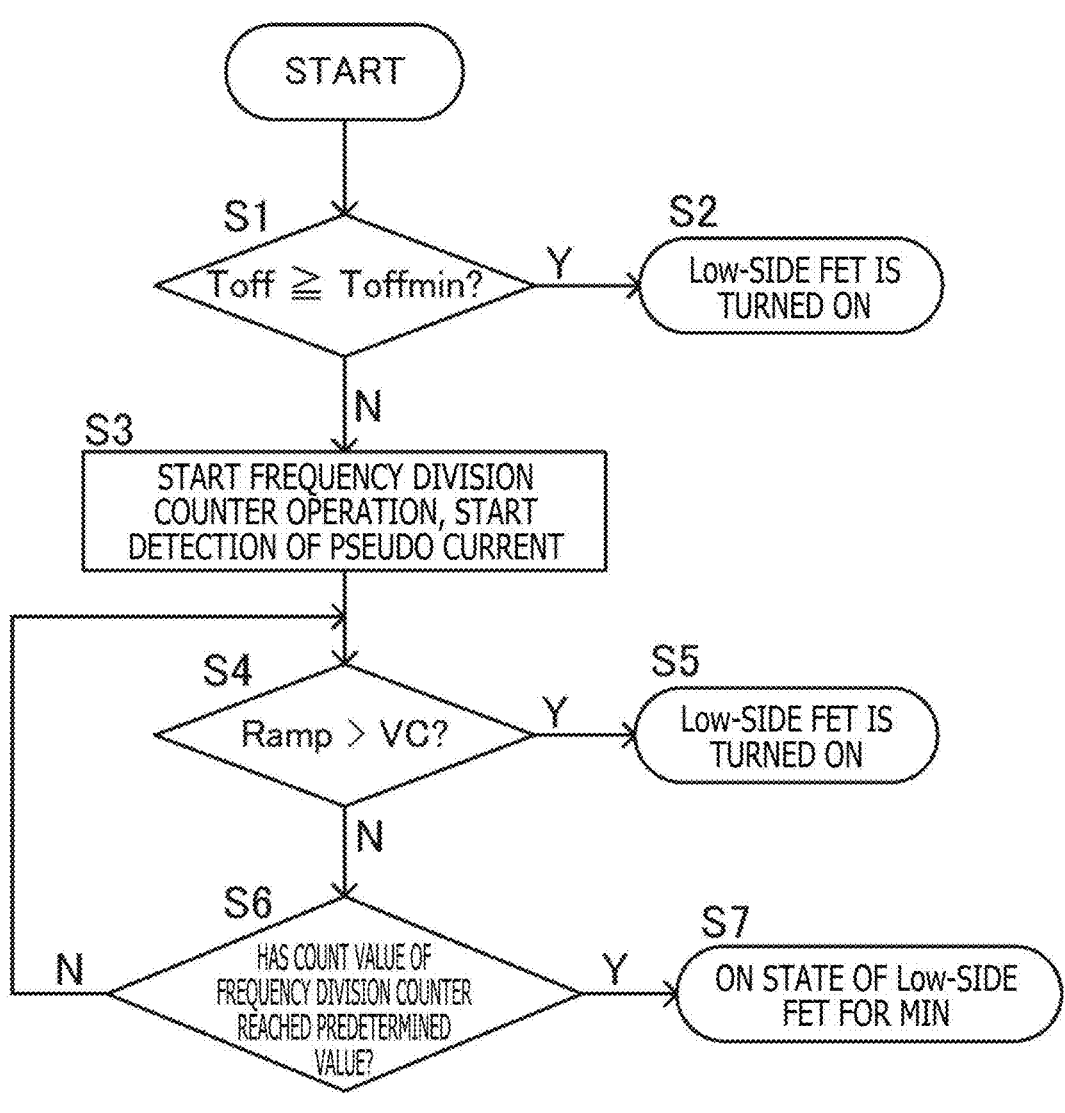
FIG. 6 is a flowchart of a process regarding a frequency-divided operation.

Here, the frequency division operation will be explained with reference to a flowchart in FIG. 6. First, when the logic circuit 16 determines that the OFF time period Toff is equal to or longer than the minimum OFF time period Toffmin in step S1 (Y in step S1), the process proceeds to step S2 where the low-side transistor M2 is switched to the ON state (the high-side transistor M1 is switched to the OFF state). This determination can be made on condition that the remaining OFF time period Toff in the switching cycle Tsw is equal to or longer than the minimum OFF time period Toffmin at a timing of assertion of the reset signal Rst. FIG. 5 depicts one example of this case.

On the other hand, when the logic circuit 16 determines in step S1 that the OFF time period Toff is shorter than the minimum OFF time period Toffmin (N in step S1), the process proceeds to step S3. In this case, the remaining OFF time period Toff in the switching cycle Tsw is shorter than the minimum OFF time Toffmin at a timing of assertion of the reset signal Rst, or the OFF time period Toff in the switching cycle Tsw is zero because the ramp voltage Ramp does not reach the amplifier output voltage Vc before the clock signal CLK falls.

When the process proceeds to step S3, the high-side transistor M1 is not turned off but is maintained in the ON state (while the OFF state of the low-side transistor M2 is maintained). In step S3, a frequency division counter (not depicted) is started, and detection of a pseudo current is also started. The frequency division counter is configured to count switching cycles.

When the ramp voltage Ramp has reached the amplifier output voltage Vc in step S4 (Y in step S4), the process proceeds to step S5 where the low-side transistor M2 is switched to the ON state (the high-side transistor M1 is switched to the OFF state).

On the other hand, when the ramp voltage Ramp has not reached the amplifier output voltage Vc in step S4 (N in step S4), the process proceeds to step S6. When the count value of the frequency division counter has not reached a predetermined value (e.g., 16) in step S6 (N in step S6), the process returns to step S4. On the other hand, when the count value has reached the predetermined value while the ramp voltage Ramp has not reached the amplifier output voltage Vc (Y in step S6), the process proceeds to step S7 where the low-side transistor M2 is switched to the ON state for the minimum OFF time period Toffmin (while the high-side transistor M1 is in the OFF state).

Accordingly, the input voltage Vin further decreases, and the OFF time period Toff becomes shorter than the minimum OFF time period Toffmin. Thus, the frequency division operation is started. Turning on of the low-side transistor M2 is omitted in at least one switching cycle. The number of switching cycles where this omission is performed is at most a number less than the predetermined value by one (for example, 15 when the predetermined value is 16). When the omission is performed in the largest number of switching cycles, the minimum OFF time period Toffmin is ensured in the last switching cycle following the omission. Therefore, in the frequency division operation, the frequency of switching is reduced, and the output voltage Vout is thus regulated.

<Clamp Control>

When the input voltage Vin decreases in the abovementioned manner, turning on of the low-side transistor M2 is omitted in a switching cycle to regulate the output voltage Vout. If the input voltage Vin further decreases and it becomes difficult to perform the regulation by the omission, the amplifier output voltage Vc increases. However, there is a possibility of overshoot of the output voltage Vout when the input voltage Vin is restored from the decreased state (voltage reduction state). In the present embodiment, therefore, such control as to clamp the amplifier output voltage Vc is performed.

As depicted in FIG. 4, a clamp circuit 20 is disposed in the power source IC 2. The clamp circuit 20 includes an amplifier 20A and an NMOS transistor 20B. The amplifier output voltage Vc is applied to a non-inverted input end of the amplifier 20A. A predetermined clamp voltage Vclamp is applied to an inverted input end of the amplifier 20A. The NMOS transistor 20B is an N-channel MOSFET. An output of the amplifier 20A is applied to a gate of the NMOS transistor 20B. A drain of the NMOS transistor 20B is connected to an application terminal of the amplifier output voltage Vc. A source of the NMOS transistor 20B is connected to the ground.

The clamp voltage Vclamp is set to be higher than the amplifier output voltage Vc of a normal time. When the amplifier output voltage Vc exceeds the clamp voltage Vclamp, the NMOS transistor 20B is turned on to clamp the amplifier output voltage Vc to the clamp voltage Vclamp. When the amplifier output voltage Vc is below the clamp voltage Vclamp, the NMOS transistor 20B is in the OFF state, and the amplifier output voltage Vc can thus take any value.

Figure 7:
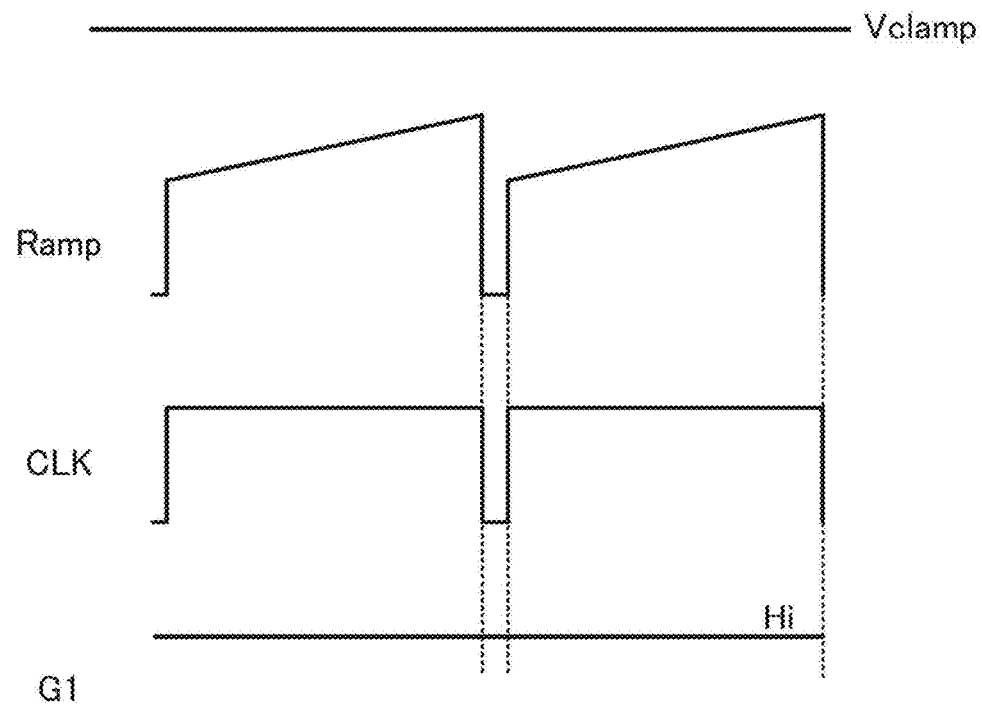
FIG. 7 is a diagram depicting waveform examples in a case where an amplifier output voltage is clamped to a clamp voltage.

FIG. 7 depicts waveform examples in a case where the amplifier output voltage Vc is clamped to the clamp voltage Vclamp. In the state depicted in FIG. 7, the frequency division operation is under execution, the ramp voltage Ramp has not reached the clamp voltage Vclamp, and the gate signal G1 is maintained at a high level.

When the input voltage Vin decreases, the feedback voltage Vfb becomes lower than the reference voltage Ref. This saturates output of the error amplifier 11 to go outside the operational range. In order to avoid this situation, the amplifier output voltage Comp is also clamped in the present embodiment.

Specifically, as depicted in FIG. 4, a control signal OUT for controlling the reference voltage Ref is outputted from the amplifier 20A. The control signal OUT is a logic signal that takes a high level or a low level. By way of example, the control signal OUT is at a high level when the amplifier output voltage Vc is above the clamp voltage Vclamp, but the control signal OUT is at a low level when the amplifier output voltage Vc is equal to or below the clamp voltage Vclamp. It is to be noted that hysteresis may be provided for generation of the control signal OUT. When the control signal OUT is at a high level, the reference voltage Ref is set to a voltage value that is less than the reference value by a predetermined value. When the control signal OUT is at a low level, the reference voltage Ref is set to the reference value.

Accordingly, when the feedback voltage Vfb becomes below the reference voltage Ref due to decrease of the input voltage Vin, the amplifier output voltage Comp decreases, and the amplifier output voltage Vc increases. At this time, the amplifier output voltage Vc is clamped, and the reference voltage Ref is lowered by the control signal OUT. Thus, the amplifier output voltage Comp increases. Accordingly, the amplifier output voltage Comp can be clamped.

Figure 8:
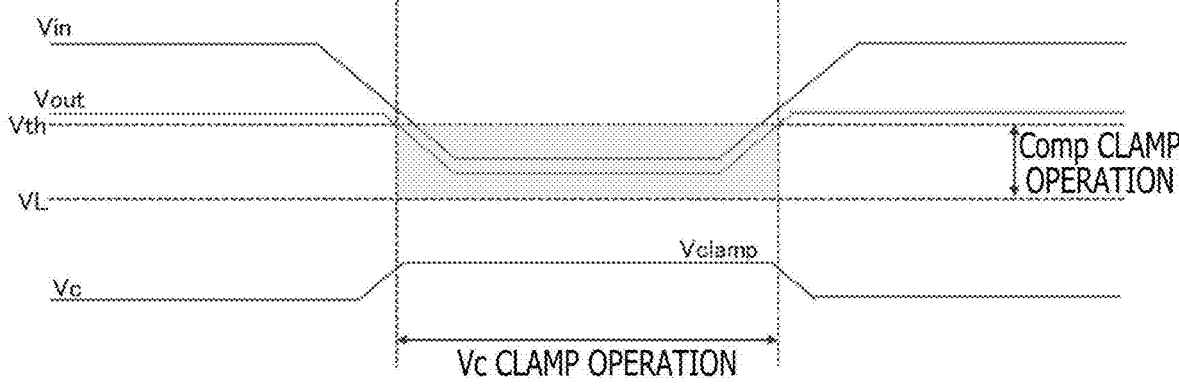
FIG. 8 is a waveform chart indicating an example of behaviors in a case where an input voltage drops and is then restored.

FIG. 8 is a waveform chart indicating an example of behaviors in a case where the input voltage Vin decreases and is then restored. In FIG. 8, from the top, a waveform example of the input voltage Vin, a waveform example of the output voltage Vout, and a waveform example of the amplifier output voltage Vc are illustrated. As depicted in FIG. 8, a threshold Vth for the output voltage Vout corresponds to the feedback voltage Vfb that is equivalent to the amplifier output voltage Comp when the amplifier output voltage Vc is at the clamp voltage Vclamp. When the output voltage Vout is equal to or below the threshold Vth, the amplifier output voltage Vc is clamped. A voltage VL in FIG. 8 is a value of the output voltage Vout corresponding to a voltage value that reduces the reference voltage Ref according to the control signal OUT.

Figure 9:
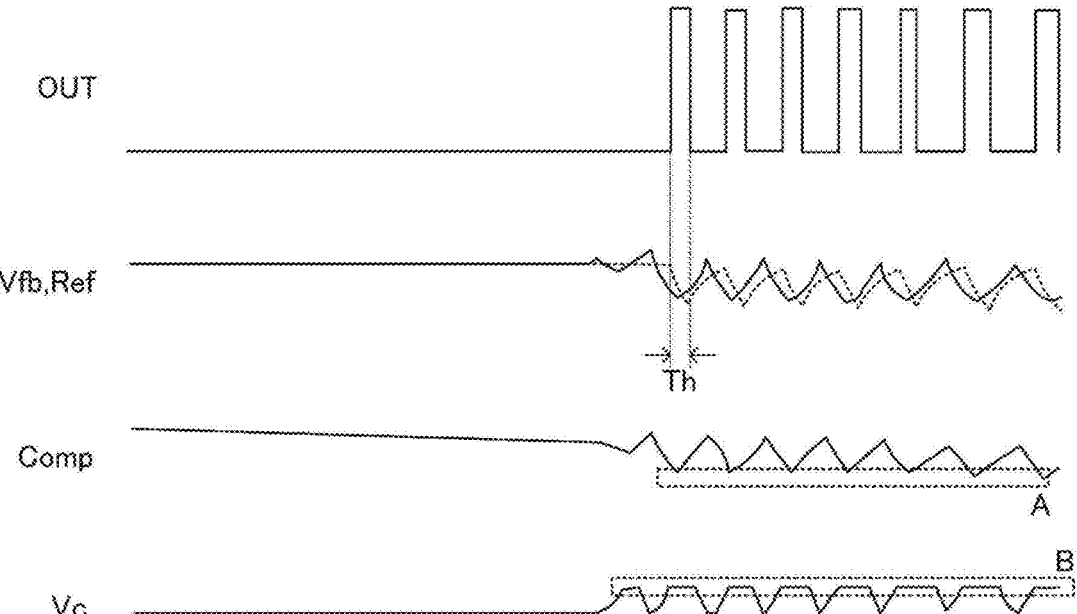
FIG. 9 is a timing chart indicating one example of an operation for clamping an amplifier output voltage.

FIG. 9 is a timing chart indicating one example of an operation for clamping the amplifier output voltages Vc and Comp. In FIG. 9, from the top, the control signal OUT, the feedback voltage Vfb (solid line), the reference voltage Ref (broken line), the amplifier output voltage Comp, and the amplifier output voltage Vc are illustrated.

FIG. 9 depicts an operation example in reduction of the input voltage Vin. During a high-level period Th of the control signal OUT, the reference voltage Ref decreases. Accordingly, the input differential voltage in the error amplifier 11 is held to be substantially constant, and the amplifier output voltage Comp is clamped (area A). Further, the amplifier output voltage Vc is also clamped to the clamp voltage Vclamp (area B).

<Clamp Circuit Control Unit>

In the present embodiment, the power source IC 2A includes a clamp circuit control unit 21, as depicted in FIG. 4. The clamp circuit control unit 21 enables/disables the clamp circuit 20 (more specifically, the amplifier 20A). Here, the operation of the clamp circuit control unit 21 will be explained according to a flowchart in FIG. 10.

A high-side ON/OFF signal Sh is inputted to the clamp circuit control unit 21. The high-side ON/OFF signal Sh indicates the ON/OFF state of the high-side transistor M1, and is inputted, for example, from the logic circuit 16. By way of example, the high-side ON/OFF signal Sh at a high level indicates the ON state of the high-side transistor M1, while the high-side ON/OFF signal Sh at a low level indicates the OFF state of the high-side transistor M1.

In addition, an enable signal Enb is outputted from the clamp circuit control unit 21. The enable signal Enb is supplied to the amplifier 20A. By way of example, the enable signal Enb at a high level indicates enabling, while the enable signal Enb at a low level indicates disabling. When the amplifier 20A is disabled, the NMOS transistor 20B is turned off by the output of the amplifier 20A, and the amplifier output voltage Vc can thus take any value.

Figure 10:
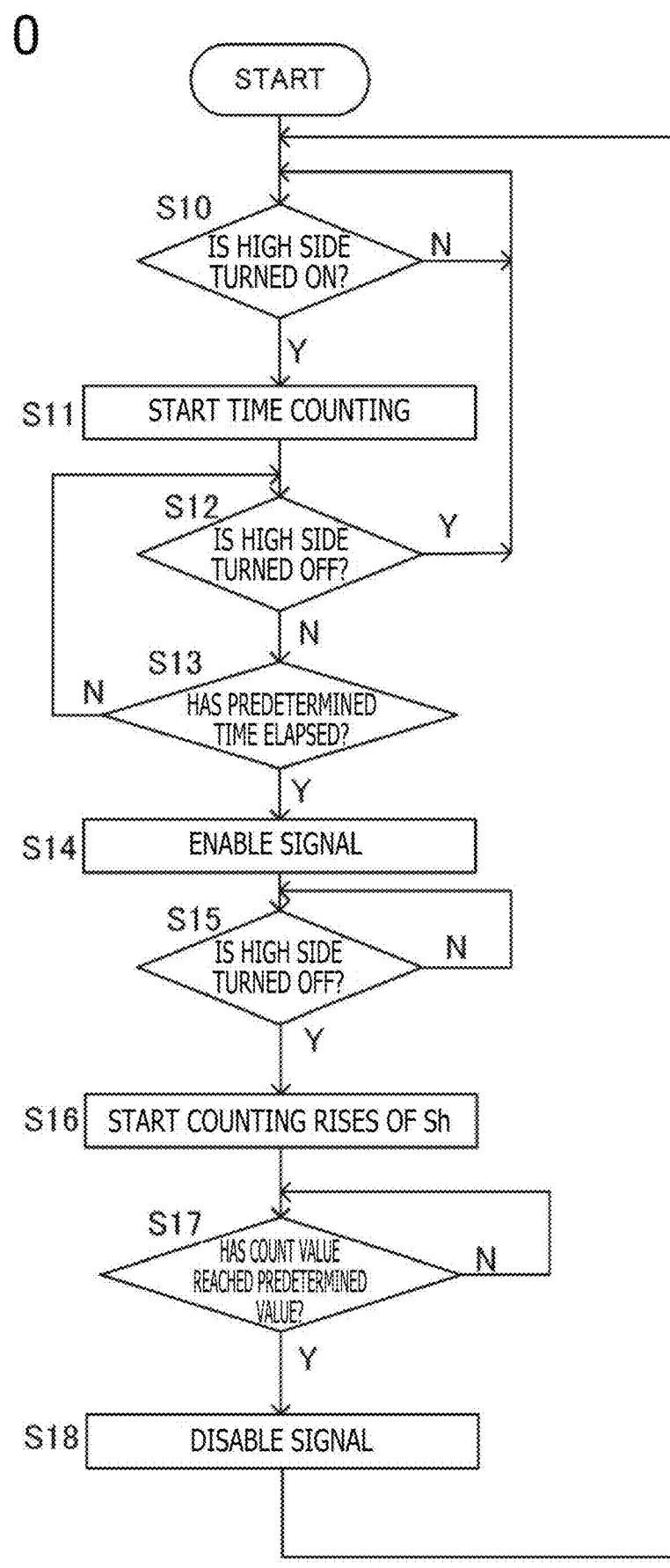
FIG. 10 is a flowchart regarding an operation of a clamp circuit control unit.

In the process in FIG. 10, in step S10, whether the high-side transistor M1 is turned on is first determined according to the high-side ON/OFF signal Sh. When the high-side transistor M1 is not turned on (N in step S10), the process returns to step S10. When the high-side transistor M1 is turned on (Y in step S10), the process proceeds to step S11. In step S11, time counting is started.

Subsequently, whether the high-side transistor M1 is turned off is determined according to the high-side ON/OFF signal Sh in step S12. When the high-side transistor M1 is not turned off (N in step S12), the process proceeds to step S13 where whether the count has reached a predetermined time is determined. When the count has not reached the predetermined time (N in step S13), the process returns to step S12. When the high-side transistor M1 is turned off before the count reaches the predetermined time (Y in step S12), the process returns to step S10.

On the other hand, when the count has reached the predetermined time while the high-side transistor M1 is not turned off (Y in step S13), the process proceeds to step S14 where the disabled enable signal Enb is enabled. Thereafter, whether the high-side transistor M1 is turned off is determined in step S15. When the high-side transistor M1 is not turned off (N in step S15), the process returns to step S15. When the high-side transistor M1 is turned off (Y in step S15), the process proceeds to step S16.

Counting rises of the high-side ON/OFF signal Sh is started in step S16. Then, whether the count has reached a predetermined value is determined in step S17. The counting is continued until the count reaches the predetermined value. After the count has reached the predetermined value (Y in step S17), the enabled enable signal Enb is disabled in step S18. Then, the process returns to step S10.

The above operation of the clamp circuit control unit 21 will be explained with reference to waveform examples in FIG. 11. In FIG. 11, from the top, the high-side ON/OFF signal Sh and the enable signal Enb are illustrated. When the high-side ON/OFF signal Sh rises to a high level, that is, when the high-side transistor M1 is turned on, the time counting is started. When the count has reached a predetermined time Tcnt while the high-side transistor M1 is in the ON state, the enable signal Enb is switched to a high level, that is, the enable signal Enb is enabled. Thereafter, the high-side ON/OFF signal Sh falls to a low level, that is, the high-side transistor M1 is turned off. At this time, counting rises of the high-side ON/OFF signal Sh is started. In the example in FIG. 11, the high-side transistor M1 is turned on and is then turned off immediately, and the turning on and off of the high-side transistor M1 are repeated a predetermined number of times. As a result, the count reaches a predetermined value. Thus, the enable signal Enb is switched to a low level, that is, is disabled. Therefore, a delay time Tdly from turning off of the high-side transistor M1 to disabling of the enable signal Enb is provided. With this delay time, overshoot of the output voltage Vout, which can be generated by immediate disabling of the enable signal Enb, can be suppressed.

<First Modification>

FIG. 12 is a diagram depicting a modification of the configuration for controlling the reference voltage Ref. The configuration depicted in FIG. 12 is different from the abovementioned configuration for generating the control signal OUT in that an amplifier 22 and voltage division resistors R11 and R12 are disposed in the power source IC 2A. It is to be noted that the clamp circuit 20 is separately disposed.

The amplifier output voltage Vc is applied to an inverted input end of the amplifier 22. The clamp voltage Vclamp is applied to a non-inverted input end of the amplifier 22. The amplifier 22 is a current-output type transconductance amplifier. An output current IOUT outputted from the amplifier 22 is inputted into a node N1 where the voltage division resistors R11 and R12 are connected. The reference voltage Ref is generated at the node N1.

Figure 13:
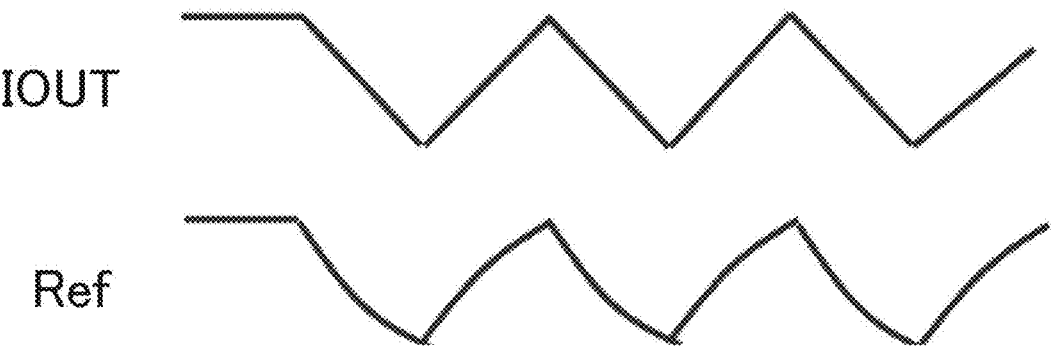
FIG. 13 is a waveform chart schematically indicating an operation in the configuration depicted in FIG. 12.

An operation performed in the configuration in FIG. 12 will be explained with reference to a schematic waveform chart depicted in FIG. 13. In FIG. 13, a waveform example of the output current IOUT and a waveform example of the reference voltage Ref are depicted. As depicted in FIG. 13, when the amplifier output voltage Vc becomes close to the clamp voltage Vclamp, the output current IOUT decreases, and the reference voltage Ref falls. When the amplifier output voltage Vc becomes apart from the clamp voltage Vclamp, the output current IOUT increases, and the reference voltage Ref rises. In this manner, the reference voltage Ref can be controlled by fluctuation of the output current IOUT.

<Second Modification>

Figure 14:
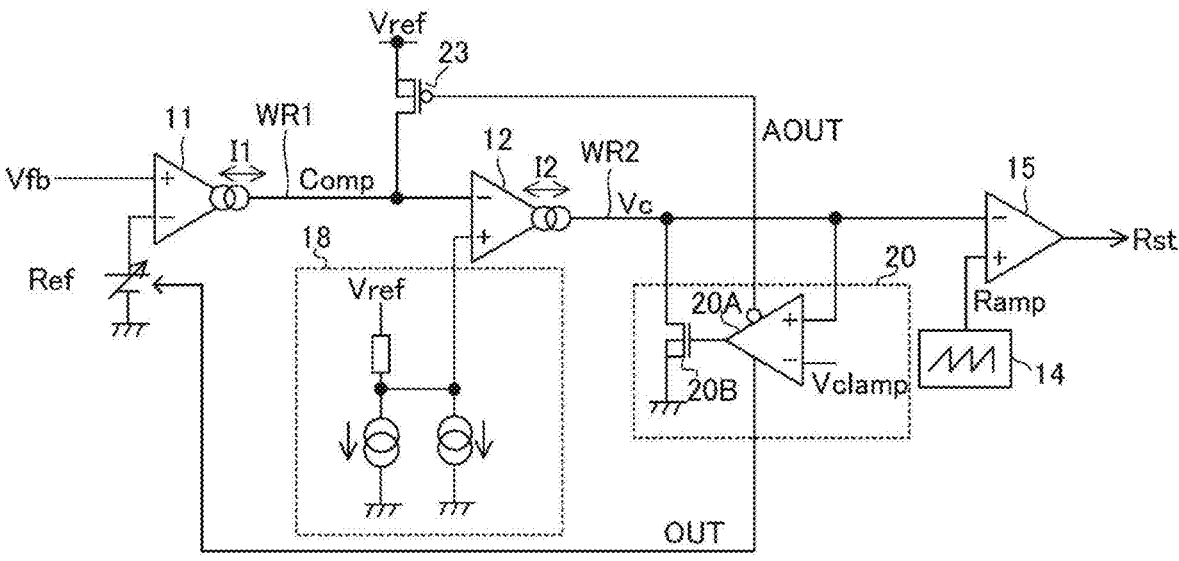
FIG. 14 is a diagram relating to a modification of the configuration in FIG. 4.

FIG. 14 is a diagram relating to a modification of the configuration described in FIG. 4. Here, a P-channel MOS (PMOS) transistor 23 for clamping the amplifier output voltage Comp is disposed in the power source IC 2A. An inversion amplifier output AOUT outputted from the amplifier 20A is applied to a gate of the PMOS transistor 23. Accordingly, when the amplifier output voltage Vc exceeds the clamp voltage Vclamp, the PMOS transistor 23 is turned on to clamp the amplifier output voltage Comp.

It is to be noted that the NMOS transistor 20B is not necessarily required in the configuration depicted in FIG. 14 because clamping of the amplifier output voltage Vc can be controlled by clamping Comp. In addition, a configuration for causing fluctuation of the reference voltage Ref by using the control signal OUT is not necessarily required in the configuration in FIG. 14.

In addition, a threshold for the amplifier output voltage Vc for generating the inversion amplifier output AOUT may be offset from the clamp voltage Vclamp for clamping the amplifier output voltage Vc. In addition, there may be a difference between a timing of clamping the amplifier output voltage Vc and a timing of fluctuating the reference voltage Ref.

<Operation During Light Load Time>

Figure 15:
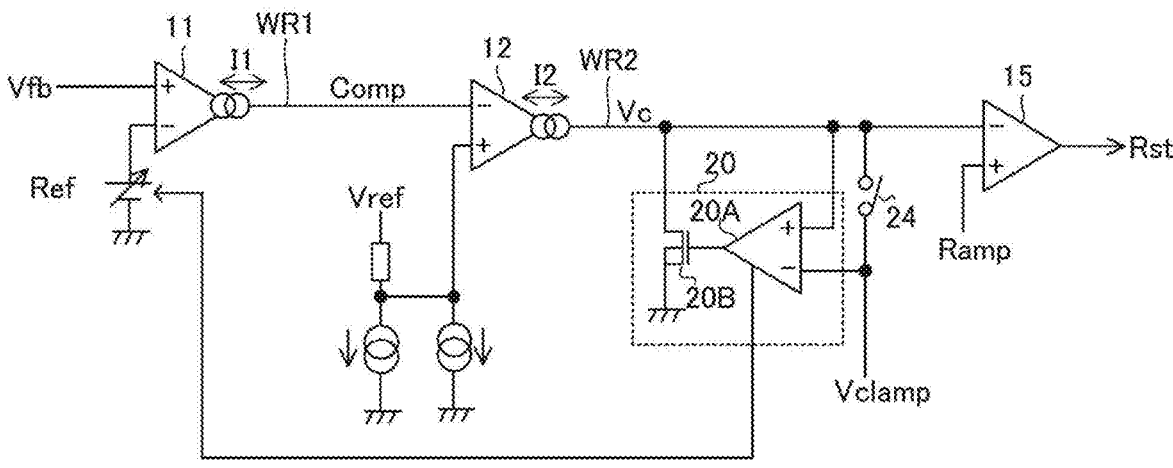
FIG. 15 is a diagram depicting a configuration considering a light load time.

The operation of the power source IC 2A during a light load time will be now explained. FIG. 15 depicts a configuration in which the operation during the light load time is taken into consideration in the abovementioned configuration in FIG. 4. Specifically, a switch 24 is disposed in the power source IC 2A. The switch 24 is connected between an application end of the clamp voltage Vclamp and an application end of the amplifier output voltage Vc. Further, the operations of the abovementioned clamp circuit CLP and the zero cross circuit ZC in FIG. 3 also will be explained.

During a stable DC/DC operation, a negative feedback state is made, so that the current detection signal Visns and the amplifier output voltage Comp are in an imaginary short circuited state. In this state, Comp follows Visns. Visns decreases when the load current increases, and Visns increases when the load current decreases. During the imaginary short circuited state, Comp behaves in a similar manner to Visns. During the light load time, Comp rises. The upper limit of Comp is defined in the clamp circuit CLP. Therefore, after the load current decreases to a certain current, Comp is not allowed to rise any more. When Comp is not allowed to rise, the voltage difference from Visns becomes large, and the amplifier output voltage Vc rises. As a result, the duty of the DC/DC operation increases, and the output voltage Vout rises.

Figure 16:
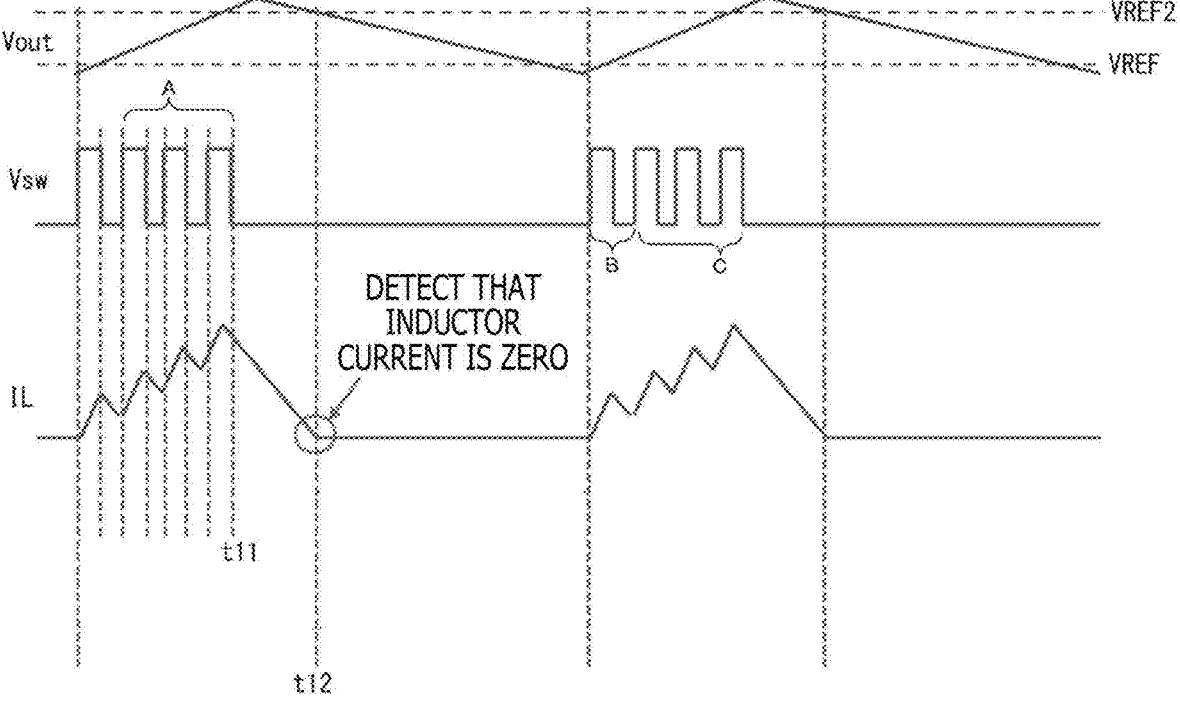
FIG. 16 is a timing chart indicating an example of an operation during the light load time.

FIG. 16 is a timing chart indicating an example of the operation during the light load time. In FIG. 16, a waveform example of the output voltage Vout, a waveform example of the switching voltage Vsw, and a waveform example of the inductor current IL are illustrated. In an area A in FIG. 16, the switching voltage Vsw is generated on the basis of Vc. Here, the output voltage Vout rises. When the output voltage Vout exceeds a reference voltage VREF2, the detection signal DET outputted from the comparator 19 is asserted. Then, the logic circuit 16 makes a transition to a first state in which the OFF state of the high-side transistor M1 and the ON state of the low-side transistor M2 are maintained (at a timing t11 in FIG. 16).

As a result of the transition to the first state, switching is stopped, and a voltage holding state is established, so that the output voltage Vout is reduced by the load current. Further, in the first state, the inductor current IL decreases. At the time of the transition to the first state, the switching voltage Vsw falls to become a negative voltage (this can be seen if FIG. 16 is enlarged). Thereafter, the switching voltage Vsw rises toward 0 V (ground level) with decrease of the inductor current IL. When the switching voltage Vsw becomes equal to or above 0 V, zero cross of the inductor current IL is detected by the zero cross circuit ZC (at a timing t12 in FIG. 16). Then, the logic circuit 16 makes a transition to a second state (high impedance state) in which the OFF state of each of the transistors M1 and M2 is maintained.

In addition, when the output voltage Vout becomes above the reference voltage VREF2, the logic circuit 16 shuts down the error amplifiers 11 and 12 and the clamp circuit 20, etc., in order to save the standby power (transition to a sleep operation). When the output voltage Vout falls to be below the reference voltage VREF (<VREF2), the logic circuit 16 restores all the shutdown circuits. However, this restoration takes time. In particular, a large capacitor for phase compensation is usually connected to outputs of the error amplifiers 11 and 12, which requires a significant amount of restoration time. In the restoration time, therefore, not Vc but the clamp voltage Vclamp is used to generate a pulse of the switching voltage Vsw. It is to be noted that this generation of a pulse is performed at least once before the restoration from the shutdown state is completed.

Figure 17:
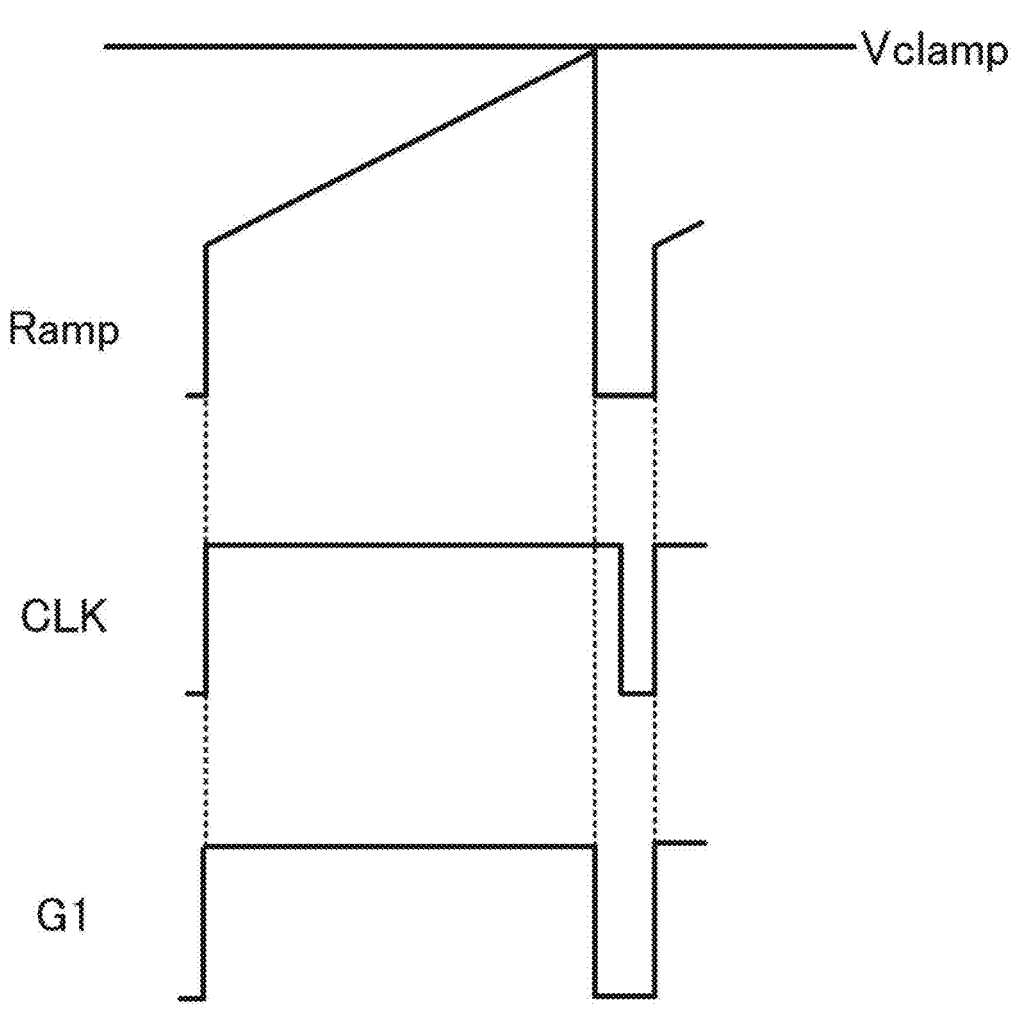
FIG. 17 is a waveform chart of restoration from a sleep operation.

Specifically, the switch 24 is brought into an ON state by the logic circuit 16, and then, the clamp voltage Vclamp is inputted to the comparator 15. As a result, the ramp voltage Ramp and the clamp voltage Vclamp are compared by the comparator 15. Here, an ON-pulse of the gate signal G1 for bringing the high-side transistor M1 into the ON state under control of the logic circuit 16 is generated as depicted in a waveform example in FIG. 17. After the On-pulse is generated once, the logic circuit 16 turns off the switch 24 to release the output of the error amplifier 12. Vclamp is used to generate a switching pulse in an area B in FIG. 16, and then, the normal operation is restored. In addition, Vc is used to generate a switching pulse in an area C in FIG. 16. In this manner, in the present embodiment, the clamp voltage Vclamp can be used in both cases: clamping of the amplifier output voltage Vc and generation of the ON-pulse at the restoration from the sleep operation. It is to be noted that the clamp voltage Vclamp may be the same during the frequency division operation and during the light load time, but the level of the clamp voltage Vclamp during the light load time may be higher than that during the frequency division operation. The clamp voltages Vclamp for the frequency division operation and the light load time may be different from each other. As a result of the above control, hysteresis is provided for a transition from a light load mode to PWM and a transition from PWM to the light load mode, so that smooth switching can be realized. Further, the number of times of switching during the light load mode can be reduced, whereby the efficiency property can be improved.

Figure 18:
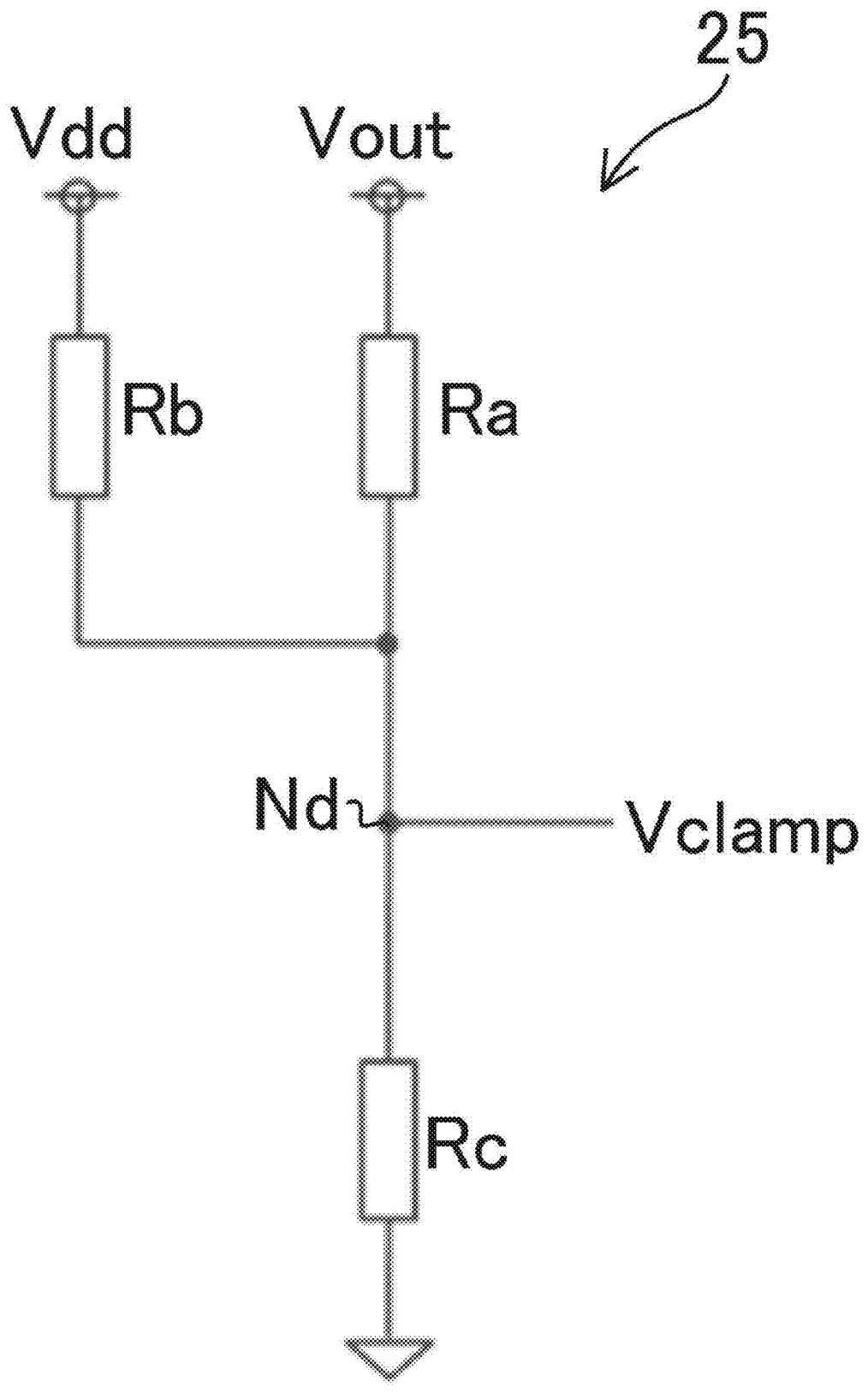
FIG. 18 is a diagram depicting a configuration example of a clamp voltage generation circuit.

FIG. 18 depicts a clamp voltage generation circuit 25 that generates the clamp voltage Vlamp. The clamp voltage generation circuit 25 includes resistors Ra, Rb, and Rc. One end of the resistor Ra is connected to an application end of the output voltage Vout. One end of the resistor Rb is connected to an application end of the power source voltage Vdd. The other end of each of the resistors Ra and Rb is connected, at a node Nd, to one end of the resistor Rc. The other end of the resistor Rc is connected to the ground. The clamp voltage Vclamp is generated at the node Nd.

The clamp voltage Vclamp is expressed by Expression (3) below.

[Math 1]

$$Vclamp = \frac{Rc}{RaRc + RaRc + RbRc}(RbVout + RaVdd) \qquad (3)$$

The clamp voltage Vclamp includes information regarding the output voltage Vout. With this information, the clamp voltage Vclamp for clamping the amplifier output voltage Vc can be set according to the output voltage Vout. In addition, the duty of an On-pulse generated at the time of restoration from the sleep operation can be set according to the output voltage Vout because the gradient ΔV of a voltage increase of the ramp voltage Ramp depends on the input voltage Vin.

It is to be noted that, during voltage reduction, a light load mode operation is not executed, but a PWM operation is executed.

<Application to Vehicle>

Figure 19:
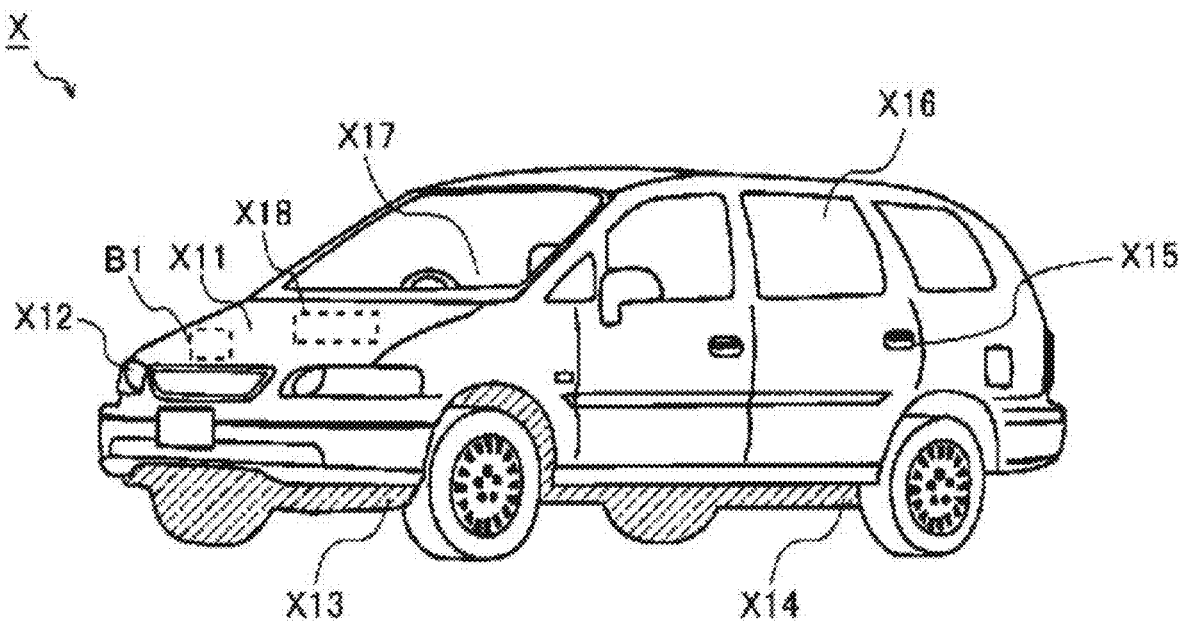
FIG. 19 is a diagram of an external appearance of one example of a vehicle.

FIG. 19 is a diagram of an external appearance of a vehicle X. The vehicle X of the present configuration example includes the DC/DC converter 1 including the power source IC 2A to which a battery voltage outputted from a battery B1 is supplied as the input voltage Vin. A variety of electronic apparatuses X11 to X18 are installed in the vehicle X, as depicted in FIG. 19. At least any one of the electronic apparatuses X11 to X18 operates according to the output voltage Vout outputted from the DC/DC converter 1. The installation positions of the electronic apparatuses X11 to X18 in FIG. 19 may be different from the actual positions, for convenience of illustration.

The electronic apparatus X11 is an engine control unit that performs control related to an engine (e.g., injection control, electronic throttle control, idling control, oxygen sensor heater control, or auto cruise control).

The electronic apparatus X12 is a lamp control unit that performs light ON/OFF control of a high intensity discharged lamp (HID), a daytime running lamp (DRL), etc.

The electronic apparatus X13 is a transmission control unit that performs control related to a transmission.

The electronic apparatus X14 is a control unit that performs control related to motion of the vehicle X (anti-lock brake system (ABS) control, electric power steering (EPS) control, electronic suspension control, etc.).

The electronic apparatus X15 is a security control unit that controls driving of a door lock or a crime prevention alarm.

The electronic apparatus X16 is installed in the vehicle X in a factory shipping stage, as a standard accessory or an option provided from a manufacturer, such as a wiper, an electric door mirror, a power window, a damper (shock absorber), an electric sunroof, or an electric seat.

The electronic apparatus X17 is an electronic apparatus such as an on-vehicle audio/visual (A/V) device, a car navigation system, or an electronic toll collection system (ETC), which are optionally mounted on the vehicle X as a user option product.

The electronic apparatus X18 is an electronic apparatus equipped with a high voltage resistance motor, such as an on-vehicle blower, an oil pump, a water pump, or a battery cooling fan.

Thus, with the power source IC 2A installed in the vehicle X, even if cold cranking in which a battery voltage drops occurs, a switching frequency is seamlessly reduced through the frequency division operation to regulate the output voltage Vout. Further, when the battery voltage is restored, overshoot of the output voltage Vout can be suppressed by clamping the amplifier output voltage.

<Others>

Aside from the embodiment described above, various technical features disclosed in the present description can variously be modified without deviating from the gist of the technical creation. In other words, the embodiment described above is merely for illustrative purposes in every aspect and should not be interpreted as limitations. The technical scope of the present disclosure is not limited to the abovementioned embodiment and should be understood to encompass all modifications thereof within meanings and scopes equivalent to the claims.

<Supplement>

As described above, a power source control device (2A) according to one mode of the present disclosure is a power source control device for a DC/DC converter (1) including a high-side transistor (M1) having a first end connected to an application end of an input voltage (Vin), a low-side transistor (M2) having a first end connected, at a first node, to a second end of the high-side transistor, and an inductor (L1) connected to the first node. The power source control device has a configuration (first configuration) including a first error amplifier (11) configured to receive a first reference voltage (Ref) and a feedback voltage (Vfb) based on an output voltage (Vout) of the DC/DC converter, a second error amplifier (12) configured to receive an output (Comp) of the first error amplifier and a signal (Visns) indicating information regarding a current flowing through the inductor, a first comparator (15) configured to receive an output (Vc) of the second error amplifier and a ramp voltage (Ramp), a switching control unit (16) configured to perform switching control of the high-side transistor and the low-side transistor according to an output of the first comparator, and a clamp circuit (20) configured to clamp a second amplifier output voltage (Vc) outputted from the second error amplifier, to a predetermined clamp voltage (Vclamp), in which the switching control unit performs an omission operation for maintaining an ON state of the high-side transistor by omitting turning on of the low-side transistor in at least one switching cycle, and the clamp circuit performs the clamping during the omission operation.

Further, in the first configuration described above, a configuration (second configuration) may be adopted in which the clamp circuit (20) includes a first amplifier (20A) configured to receive the second amplifier output voltage and the clamp voltage and an NMOS transistor (20B) that has a gate to which an output of the first amplifier is inputted and that is connected between an application end of the second amplifier output voltage and ground.

Further, in the second configuration described above, a configuration (third configuration) may be adopted in which the first reference voltage is controlled according to a control signal (OUT) that is a logic signal outputted from the first amplifier.

Further, in the second configuration described above, a configuration (fourth configuration) may be adopted in which the power source control device further includes a second amplifier (22) configured to receive the second amplifier output voltage and the clamp voltage and a voltage division resistor (R11, R12), an output current (IOUT) from the second amplifier is outputted to a second node (N1) connected to the voltage division resistor, and the first reference voltage is generated at the second node.

Further, in the first configuration described above, a configuration (fifth configuration) may be adopted in which the clamp circuit includes a third amplifier (20A) configured to receive the second amplifier output voltage and the clamp voltage and a PMOS transistor (23) that has a gate to which an output signal (AOUT) outputted from the third amplifier is inputted, a source connected to an application end of a second reference voltage (Vref), and a drain connected to an application end of a first amplifier output voltage (Comp) outputted from the first error amplifier.

Further, in any one of the second to fourth configurations described above, a configuration (sixth configuration) may be adopted in which the power source control device further includes a clamp circuit control unit (21) configured to receive a high-side ON/OFF signal (Sh) indicating ON/OFF of the high-side transistor and output an enable signal (Enb) to the first amplifier, and the clamp circuit control unit enables the enable signal in a case where the ON state of the high-side transistor is maintained until a predetermined time has elapsed from turning on of the high-side transistor.

Further, in the sixth configuration described above, a configuration (seventh configuration) may be adopted in which the clamp circuit control unit disables the enable signal in a case where, subsequent to the enabling of the enable signal, the high-side transistor is turned off and then the turning on of the high-side transistor is repeated a predetermined number of times.

Further, in any one of the first to seventh configurations described above, a configuration (eighth configuration) may be adopted in which the power source control device further includes a light load mode control unit (16) configured to make a transition to a sleep operation in a case where a light load is detected and a switch (24) connected between an application end of the clamp voltage and an input end of the first comparator, and, in a case where a drop of the output voltage during the sleep operation is detected, the light load mode control unit brings the switch into an ON state to generate at least once an ON-pulse for bringing the high-side transistor into an ON state according to a comparison between the ramp voltage and the clamp voltage made by the first comparator.

Further, in the eighth configuration described above, a configuration (ninth configuration) may be adopted in which the power source control device further includes a clamp voltage generation circuit (25) configured to generate the clamp voltage according to the output voltage.

Further, in any one of the first to ninth configurations described above, a configuration (tenth configuration) may be adopted in which the omission is performed in a variable number, at most a predetermined maximum number, of the switching cycles.

In addition, a DC/DC converter (1) according to one mode of the present disclosure has a configuration (eleventh configuration) including the power source control device (2A) having any one of the first to tenth configurations described above, the high-side transistor, the low-side transistor, and the inductor.

Moreover, a vehicle (X) according to one mode of the present disclosure has a configuration (twelfth configuration) including the DC/DC converter (1) having the eleventh configuration described above and a battery (B1) configured to output a battery voltage as the input voltage.

INDUSTRIAL APPLICABILITY

The present disclosure can be used in DC/DC converters for various applications, for example.

What is claimed is:

1. A power source control device for a direct current to direct current converter including a high-side transistor having a first end connected to an application end of an input voltage, a low-side transistor having a first end connected, at a first node, to a second end of the high-side transistor, and an inductor connected to the first node, the power source control device comprising:

a first error amplifier configured to receive a first reference voltage and a feedback voltage based on an output voltage of the direct current to direct current converter;

a second error amplifier configured to receive an output of the first error amplifier and a signal indicating information regarding a current flowing through the inductor;

a first comparator configured to receive an output of the second error amplifier and a ramp voltage;

a switching control unit configured to perform switching control of the high-side transistor and the low-side transistor according to an output of the first comparator; and a clamp circuit configured to clamp a second amplifier output voltage outputted from the second error amplifier, to a predetermined clamp voltage, wherein the switching control unit performs an omission operation for maintaining an ON state of the high-side transistor by omitting turning on of the low-side transistor in at least one switching cycle, and the clamp circuit performs the clamping during the omission operation.

2. The power source control device according to claim 1, wherein the clamp circuit includes a first amplifier configured to receive the second amplifier output voltage and the clamp voltage, and an N-channel metal oxide semiconductor transistor that has a gate to which an output of the first amplifier is inputted and that is connected between an application end of the second amplifier output voltage and ground.

3. The power source control device according to claim 2, wherein the first reference voltage is controlled according to a control signal that is a logic signal outputted from the first amplifier.

4. The power source control device according to claim 2, further comprising:

a second amplifier configured to receive the second amplifier output voltage and the clamp voltage; and a voltage division resistor, wherein an output current from the second amplifier is outputted to a second node connected to the voltage division resistor, and the first reference voltage is generated at the second node.

5. The power source control device according to claim 1, wherein the clamp circuit includes a third amplifier configured to receive the second amplifier output voltage and the clamp voltage, and a P-channel metal oxide semiconductor transistor that has a gate to which an output signal outputted from the third amplifier is inputted, a source connected to an application end of a second reference voltage, and a drain connected to an application end of a first amplifier output voltage outputted from the first error amplifier.

6. The power source control device according to claim 2, further comprising:

a clamp circuit control unit configured to receive a high-side ON/OFF signal indicating ON/OFF of the high-side transistor and output an enable signal to the first amplifier, wherein the clamp circuit control unit enables the enable signal in a case where the ON state of the high-side transistor is maintained until a predetermined time has elapsed from turning on of the high-side transistor.

7. The power source control device according to claim 6, wherein the clamp circuit control unit disables the enable signal in a case where, subsequent to the enabling of the enable signal, the high-side transistor is turned off and then the turning on of the high-side transistor is repeated a predetermined number of times.

8. The power source control device according to claim 1, further comprising:

a light load mode control unit configured to make a transition to a sleep operation in a case where a light load is detected; and a switch connected between an application end of the clamp voltage and an input end of the first comparator, wherein, in a case where a drop of the output voltage during the sleep operation is detected, the light load mode control unit brings the switch into an ON state to generate at least once an ON-pulse for bringing the high-side transistor into an ON state according to a comparison between the ramp voltage and the clamp voltage made by the first comparator.

9. The power source control device according to claim 8, further comprising:

a clamp voltage generation circuit configured to generate the clamp voltage according to the output voltage.

10. The power source control device according to claim 1, wherein the omission is performed in a variable number, at most a predetermined maximum number, of the switching cycles.

11. A direct current to direct current converter comprising:

the power source control device according to claim 1;

the high-side transistor;

the low-side transistor; and the inductor.

12. A vehicle comprising:

the direct current to direct current converter according to claim 11; and a battery configured to output a battery voltage as the input voltage.

* * * * *